(12) United States Patent
Obermeyer

(10) Patent No.: US 6,880,894 B2
(45) Date of Patent: Apr. 19, 2005

(54) DUMP TRAILER FOR ASPHALT PAVING

(76) Inventor: James H. Obermeyer, 1018 E. Summit, Crown Point, IN (US) 46307

( * ) Notice: Subject to any disclaimer, the term of this patent is extended or adjusted under 35 U.S.C. 154(b) by 0 days.

(21) Appl. No.: 10/090,693

(22) Filed: Mar. 4, 2002

(65) Prior Publication Data

US 2002/0122694 A1 Sep. 5, 2002

Related U.S. Application Data

(60) Provisional application No. 60/273,232, filed on Mar. 2, 2001.

(51) Int. Cl.⁷ .................................................. B60P 1/04
(52) U.S. Cl. ...................... 298/17 R; 298/11; 298/22 R; 298/17 B
(58) Field of Search ................................ 298/11, 17 R, 298/22 R, 22 J, 22 D, 178

(56) References Cited

U.S. PATENT DOCUMENTS

| | | | |
|---|---|---|---|
| 1,602,424 A | | 10/1926 | Wood |
| 1,659,245 A | * | 2/1928 | Delker ...................... 298/17 R |
| 1,733,988 A | * | 10/1929 | Barnard |
| 2,037,999 A | * | 4/1936 | Ochnser .................... 298/22 D |
| 2,770,490 A | | 11/1956 | Hockensmith, Jr. |
| 2,887,672 A | * | 5/1959 | Morano et al. |
| 3,336,080 A | | 8/1967 | Heck et al. |
| 3,447,700 A | | 6/1969 | Nickel |
| 3,642,324 A | * | 2/1972 | Conner ......................... 298/11 |
| 4,305,619 A | * | 12/1981 | Sas ........................... 298/17 B |
| 5,102,198 A | * | 4/1992 | Hagenbuch ................ 298/17 B |
| 5,383,714 A | | 1/1995 | Hunter ...................... 298/17 R |
| 5,509,724 A | | 4/1996 | Perry et al. ................ 298/22 D |
| 5,513,901 A | * | 5/1996 | Smith et al. ............... 298/22 J |
| 6,186,596 B1 | * | 2/2001 | Jones ........................ 298/19 B |
| 6,238,162 B1 | | 5/2001 | Mayer et al. |
| 6,302,637 B1 | | 10/2001 | Andros |

* cited by examiner

Primary Examiner—Stephen Gordon
(74) Attorney, Agent, or Firm—Woodard, Emhardt, Moriarty, McNett & Henry LLP

(57) ABSTRACT

An improved dump trailer hinge design for use in asphalt paving applications is disclosed. The hinge system may be used on dump or straight trailers having half or full trailer frames. The trailer dump bed is hingeably mounted to the trailer frame by hinge arms having a length greater than the vertical distance between the hinge and the trailer bed. A mud flap mounting bracket suitable for use with the hinge system is also disclosed.

18 Claims, 6 Drawing Sheets

US 6,880,894 B2

DUMP TRAILER FOR ASPHALT PAVING

This application claims priority to and incorporates by reference U.S. Provisional Application Ser. No. 60/273,232 filed Mar. 2, 2001.

FIELD OF THE INVENTION

This invention deals with the field of asphalt paving and more particularly with an improved dump trailer for dumping asphalt material into a hopper with a structure in conformance with applicable regulations.

BACKGROUND OF THE INVENTION

In typical paving operations, the raw asphalt material is stored in a dump truck or straight truck for transport and is then dumped or pushed into a hopper adjacent the rear of the truck. The hopper then feeds the material to the paving equipment which lays the material as asphalt paving. When involved with this type of operation, it is preferred that the paving material be dumped directly from the truck into the hopper without spilling material onto the surrounding area. Moreover, it is also preferred to use a dump truck instead of a straight truck due to the ability to dump the material using a gravity feed and due to a dump trailer's greater carrying capacity than that of a straight truck.

To accommodate this operation, typically an asphalt hopper is positioned very close to the rear of the dump trailer with the front edge of the hopper underneath the trailer's sill. Spacer wheels can be placed on the hopper which abut the trailer's rear wheels to provide the correct spacing. Prior trailers have allowed the sill to overlap the hopper by having the rear wheels of the trailer set in at least approximately 12 inches or more from the rear edge of the trailer.

Recent federal regulations have required, for safety reasons, that trucks having rear wheels set more than 12 inches from the rear edge of the trailer include rear, shock absorbing bumpers mounted to the rear of the trailer to prevent smaller vehicles from traveling under the trailer in a collision. While desirable from a safety aspect, this also prevents the hopper from extending underneath the trailer sill. To compensate for this problem, paving companies are rebuilding older trailers or some manufactures have proposed folding or collapsible bumpers which are deployed during normal driving and stored during dumping.

In practice, collapsible bumpers have been unwieldy, expensive and have caused customer complaints. An alternate solution is to connect a spill guard to the rear edge of the dump trailer thereby extending the length of the trailer. This solution is unsatisfactory as it essentially violates the federal requirements. A third alternative has been to use a straight trailer, which is not yet subject to the same requirements, but this entails the disadvantage of a smaller load as compared to a dump trailer. Accordingly, there is a need for an improved dump trailer which provides sufficient load capacity and the ability to efficiently transfer paving material from the trailer to the hopper without waste and which complies with federal safety regulations.

A further concern in existing hoppers used with dump trailers is that the extended lip can interfere with the front panel of the hopper. To compensate for this interference, many operators have removed the upper portion of the hopper's front panel to provide clearance, but which simultaneously reduces the hopper's capacity. Accordingly, there is a need for a design in which the front panel of the hopper does not need to be reduced in size.

The present invention addresses these concerns.

SUMMARY OF THE INVENTION

The invention is set forth in the claims below, and the following is not in any way to limit, define or otherwise establish the scope of legal protection. In general terms, the present invention relates to an improved dump trailer for the delivery of asphalt to a paving machine.

One embodiment of the present invention is a dump trailer for the delivery of asphalt to a paving machine where the dump bed of the trailer is attached to the trailer frame by at least one angled hinge arm.

A further embodiment of the present invention pertains to a dump trailer for the delivery of asphalt to a paving machine having a dump bed hinge attached below the trailer frame.

Still another embodiment of the present invention relates to a mud flap bracket for use with a dump trailer having an angled hinge arm between the dump bed and the trailer frame.

Further objects, embodiments, forms, benefits, aspects, features and advantages of the present invention may be obtained from the present disclosure.

DETAILED DESCRIPTION OF THE INVENTION

Figure 1:
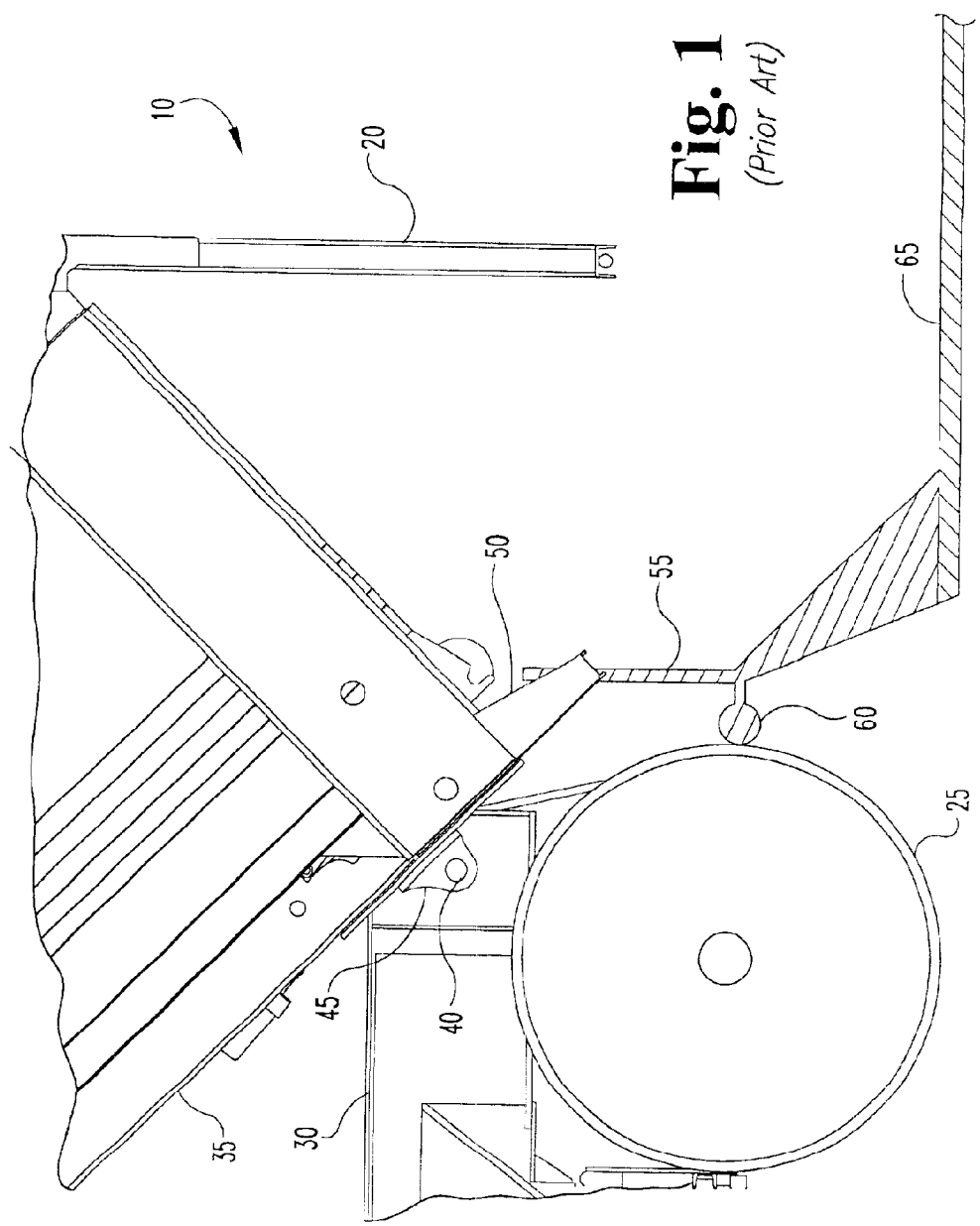
FIG. 1 is a partial cross-sectional view of a portion of dump trailer and paving machine hopper according to the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated device and method and further applications of the principles of the invention as illustrated therein, are herein contemplated as would normally occur to one skilled in the art to which the invention relates.

The present invention provides an improved dump trailer for transferring asphalt pavement material from a dump trailer to the hopper of a paving machine. To comply with applicable safety regulations which require reinforced bumpers on trailers with set back wheels or older trailers which are not regulated, paving operators have used prior art dump trailers 10 with the wheels 25 placed less than twelve inches from the rear of the trailer as seen in FIG. 1. However, when the wheels 25 are not set back sufficiently from the rear of the trailer, the paving machine material hopper 65 can not extend completely under the trailer's spill path. To provide sufficient overlap of the spill pathway over the hopper 65, one alternative is to add a spill guard 50 which extends beyond the rear of the trailer 10.

One specific feature of trailers 10 of this type is that the dump section 35 of the trailer is typically mounted with a sturdy axle 40 and hinge 45 arrangement through the trailer frame 30. This causes the dump section 35 of the trailer 10 to pivot directly around an axis through the axle 40 or hinge pin. This solution is unsatisfactory, however, as when the trailer 10 is positioned near the hopper 65 such that the spacing bumper 60 contacts the rear trailer tire 25, the spill guard 50 interferes with the hopper's front panel 55. Correction of this problem by lowering the front panel 55 is also unsatisfactory as this reduces the hopper's capacity.

Figure 2:
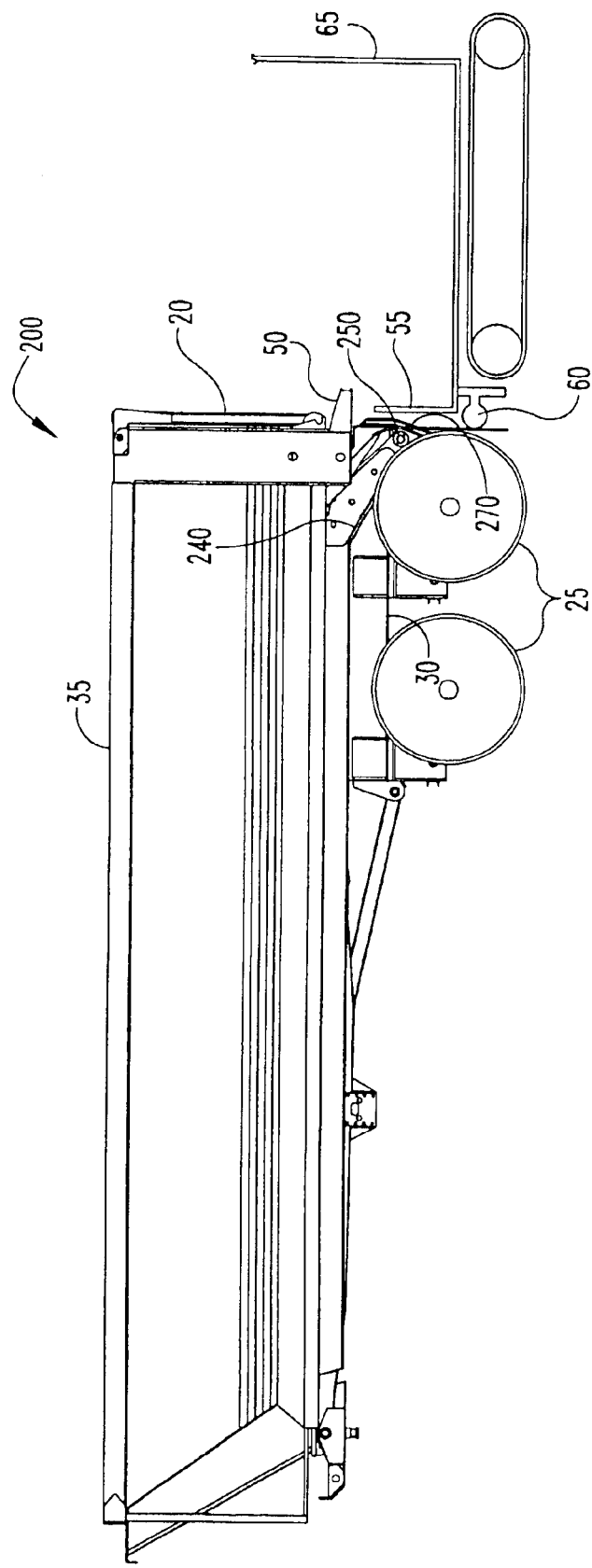
FIG. 2 is a partial cross-sectional view of a dump trailer and paving machine hopper according to one embodiment of the present invention.
Figure 3:
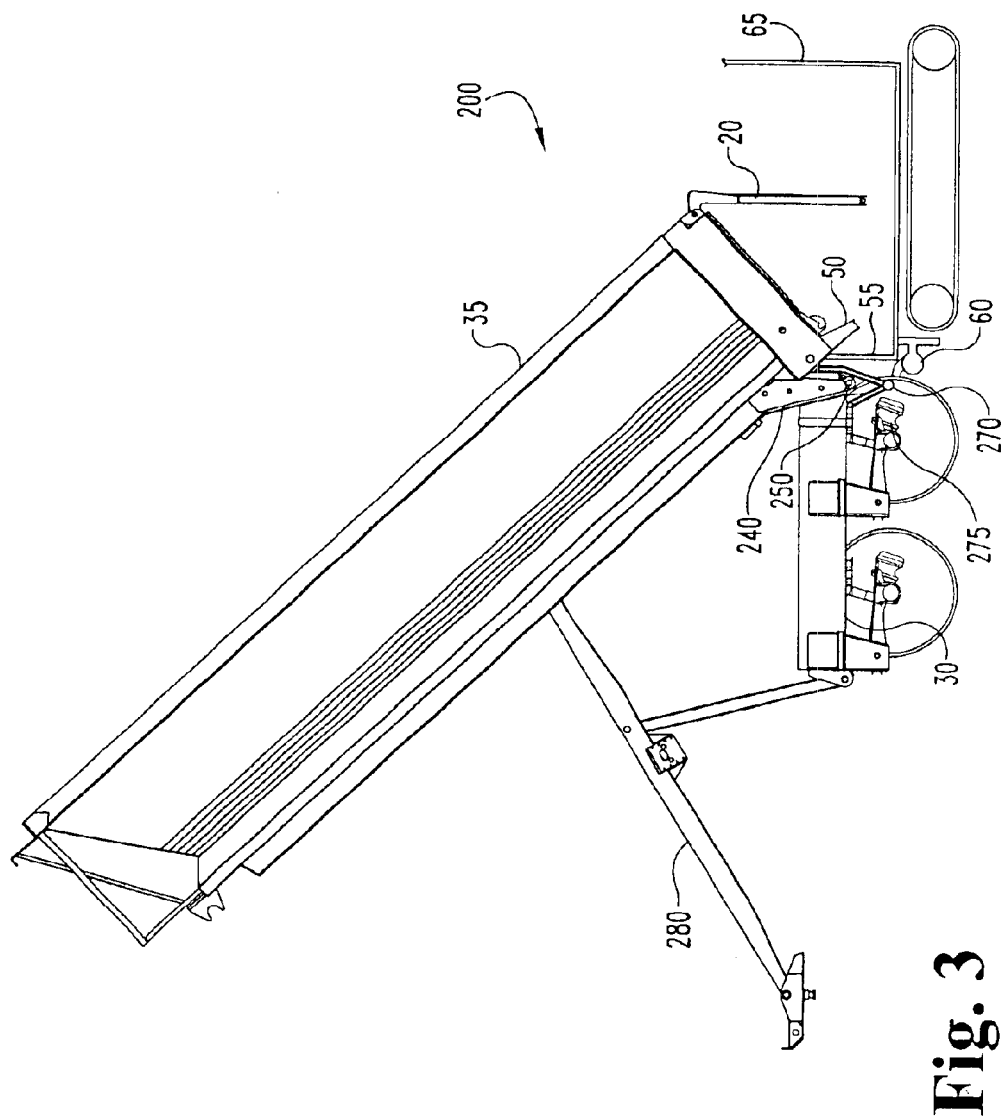
FIG. 3 is a partial cross-sectional view of the dump trailer of FIG. 2 in the raised position.

FIGS. 2–3 show a side view of a full length dump trailer incorporating the present invention. This is for illustrative purposes only and it is understood that the present invention may also be used with other trailer designs such as half or semi-length dump trailers. Additionally, the present invention may be practiced using full frame or half frame trailers. To promote clarity, certain objects such as tires have been omitted from the drawings.

FIG. 2 is a side view of a dump trailer 200 having a dump bed 35 and a bed frame 30. FIG. 2 shows a trailer 200 having a hall frame, but use of the present invention with full frame trailers is also contemplated. The dump bed 35 is hingeably mounted to the trailer frame 30 so that the dump be may be moved between the lowered position (FIG. 2) and the raised position (FIG. 3). This mounting is made through parallel hinge arms 240 fixed to opposing sides of the dump bed 35 and pivotably mounted to the trailer frame 30 by a hinge attachment 250. This attachment will be describe in greater detail in the following paragraphs. The dump bed 35 includes a lockable hinged gate 20 which covers the end of the dump bed 35 when in the lowered position as shown. Optionally, the dump trailer may also include a spill guard 50. The trailer may also include a brake guard 270 which protects the trailer's brake gear (not shown) from contact with the spacing bumper 60 of the paving machine when the trailer 200 is moved into position to deliver the asphalt material to the paving machine hopper 65.

FIG. 3 shows a side view of the trailer 200 of FIG. 2 in the raised position. Prior to raising the dump bed 35, the trailer gate 20 is unlocked to allow the gate to open so that asphalt material may exit the dump bed 35 as the bed is raised. Mechanisms for locking and unlocking the gate are well known in the industry. The dump bed 35 is raised using a raise arm 280 although other suitable methods for raising the dump bed 35 known in the industry such as hydraulic rams may also be used. As the dump bed 35 is raised, it pivots at the hinge attachment 250. Gravity causes the bed door 20 to swing open and asphalt material to exit the dump bed 35 and flow over the spill guard 50 and into the paving machine hopper 65. It is important to note that the tires 25 on the near side shown in FIG. 2 have been removed in FIG. 3 to clearly show how the brake guard 270 protects the trailer brake gear 275 from the spacing bumper 60.

Figure 4:
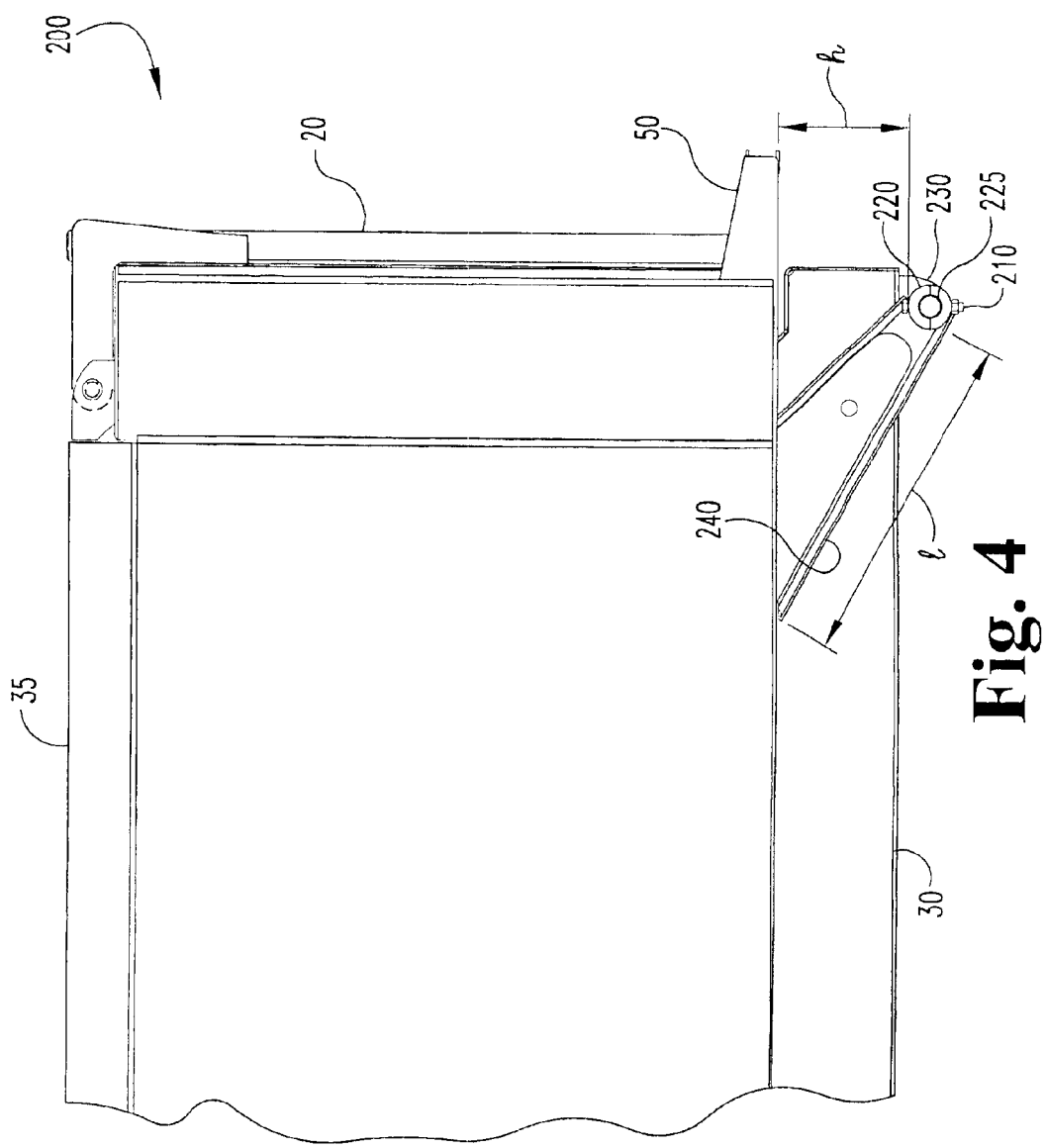
FIG. 4 is a side view of a dump trailer according to one embodiment of the present invention.
Figure 5:
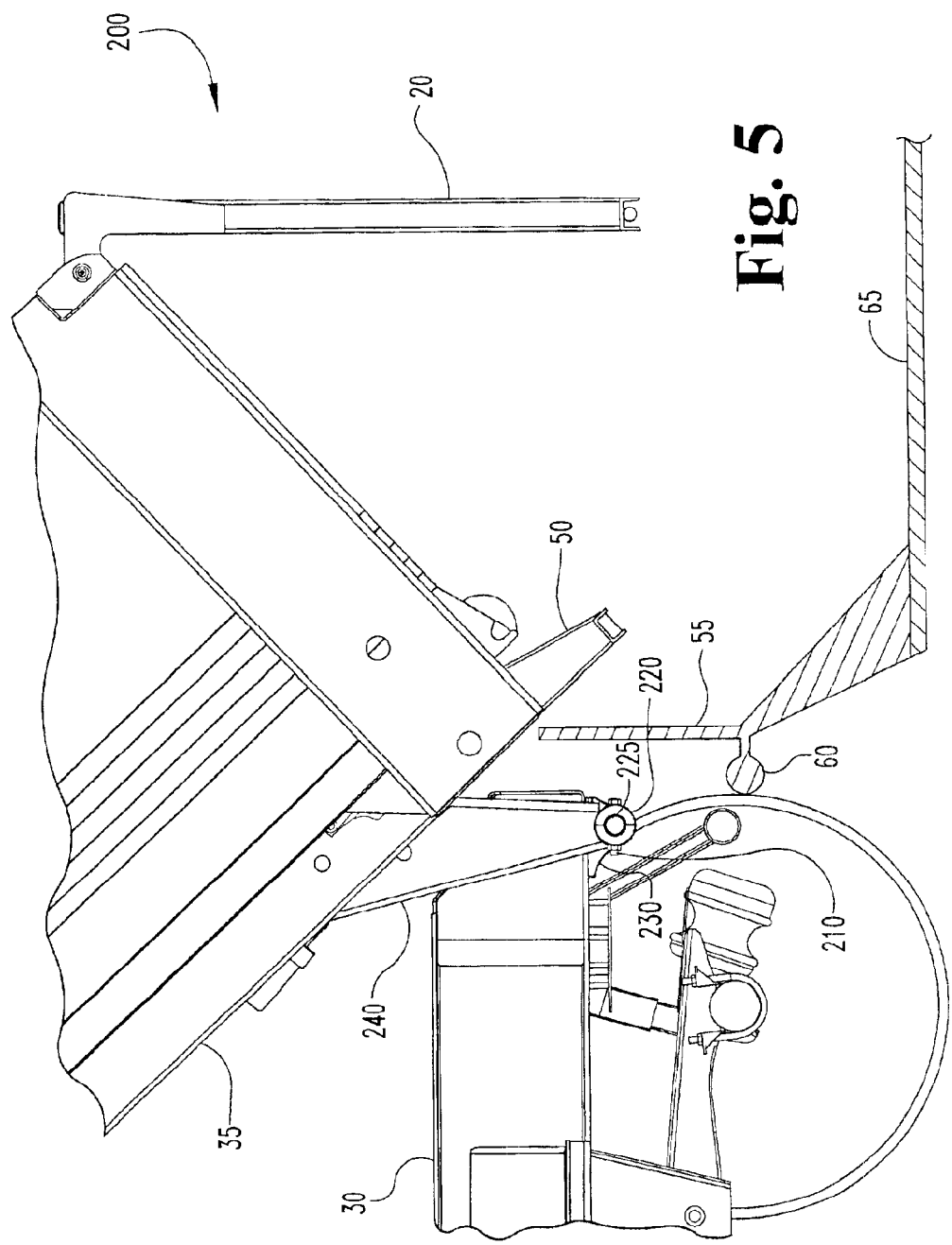
FIG. 5 is a partial cross-sectional view of the dump trailer of FIG. 4 in the raised position.

FIGS. 4 and 5 provide a more detailed view of the hinged attachment of a dump bed 35 to a trailer frame 30 according to the present invention. FIG. 4 depicts a dump bed 35 in the lowered position with the bed door 20 closed and locked. Fixed to the dump bed 35 are the hinge arms 240. Only one hinge arm 240 is shown in this side view, but a similar hinge arm is preferably located on the opposite side of the dump bed (not shown). Preferably two hinge arms 240 are used, one on each side of the dump bed 35, although the present invention also contemplates the use of more or fewer hinge arms. At the end of the hinge arm 240 distal from the dump bed 35 is a hinge collar 220. In one embodiment the hinge collar 220 may be an opening in the hinge arm 240 through which an axle 225 may pass. In other embodiments, the hinge collar 220 may be reinforced or may be a separate collar fixed to the hinge arm 240. The hinge collar 220 may also include an opening perpendicular to the axle opening to allow a retaining pin 210 to pass through the hinge collar 220 and the axle 225. Alternatively the axle 225 may extend beyond the hinge collar 220 allowing a pin 210 to pass only through the axle 225.

In the preferred embodiment, an axle 225 is mounted to the trailer frame 30 by a yoke 230 located below the frame 30. The yoke 230 may be a separate piece attached to the frame 30 by a suitable method such as welding or bolts. Alternatively, the yoke 230 may be a unitary piece of the frame 30 so long as it is located below the base of the frame 30. The axle 225 may be fixed in the yoke 230 or alternatively it may be pivotably mounted within the yoke 230. Preferably a single axle 225 is mounted to at least two points of the frame 30 by at least two yokes 230, one located on each side of the trailer frame 30. However, the present invention also contemplates the use of more or fewer yokes. In an alternate embodiment, two axles located on opposite sides of the trailer frame 30 may be used in the place of a single axle as shown.

In the preferred embodiment, the axle 225 passes through the hinge collar 220 such that the hinge collar 220 may pivot about the axle 225. A retaining pin 210 may optionally pass through the axle 225 to prevent the hinge collar 220 from sliding off the axle 225. Alternatively, if the axle 225 is pivotably mounted to the yoke 230, a pin 210 may optionally pass through the hinge collar 220 and the axle 225 to prevent accidental disengagement of the hinge collar 220 and the axle 225.

In FIG. 4, the length of the angled hinge arm 240 is depicted with line l. The vertical distance between hinge attachment 250 and the base of dump bed 35 is shown with line h. Angle θ represents the angle between line h and line l. Preferably, l is greater than h for any given hinge attachment according to the present invention. The use of angled hinge arms 240 causes the connection point between the dump bed 35 and the hinge arm 240 to rise relative to the trailer frame 30 as the dump bed 35 is moved from the lowered to the raised position. This rise imparts a rearward motion to the spill guard 50 relative to the trailer frame 30 which moves the spill guard 50 back and over the paving machine hopper front panel 55. The exact length of the hinge arm l necessary to produce a particular rise of the dump bed 35 relative to the trailer frame 30 and the corresponding angle θ may be calculated using standard trigonometric functions.

FIG. 5 shows a detailed side view of the hinge system according of FIG. 4 in the raised position. As the dump bed 35 is raised, the hinge arm 240 pivots about the axle 225. Due to the hinge arm's 240 length and it's attachment point on the dump bed 35, this rotation displaces the dump bed 35 in an upward direction compared to the displacement of a traditional hinge attachment as shown in FIG. 1. This displacement allows the dump bed 35 and spill guard 50 to clear the top of the hopper front panel 55 of a paving machine. This displacement also extends the spill path of the asphalt material backwards from the rear of the dump bed 35 thereby allowing the trailer to be positioned farther from the paving machine when unloading the asphalt material. It will of course be understood that the hinge castings, hinge pins and hinge arms with appropriate connections will need to be of sufficient size and strength to safely support the pressures on it from the dump section's weight.

Figure 6:
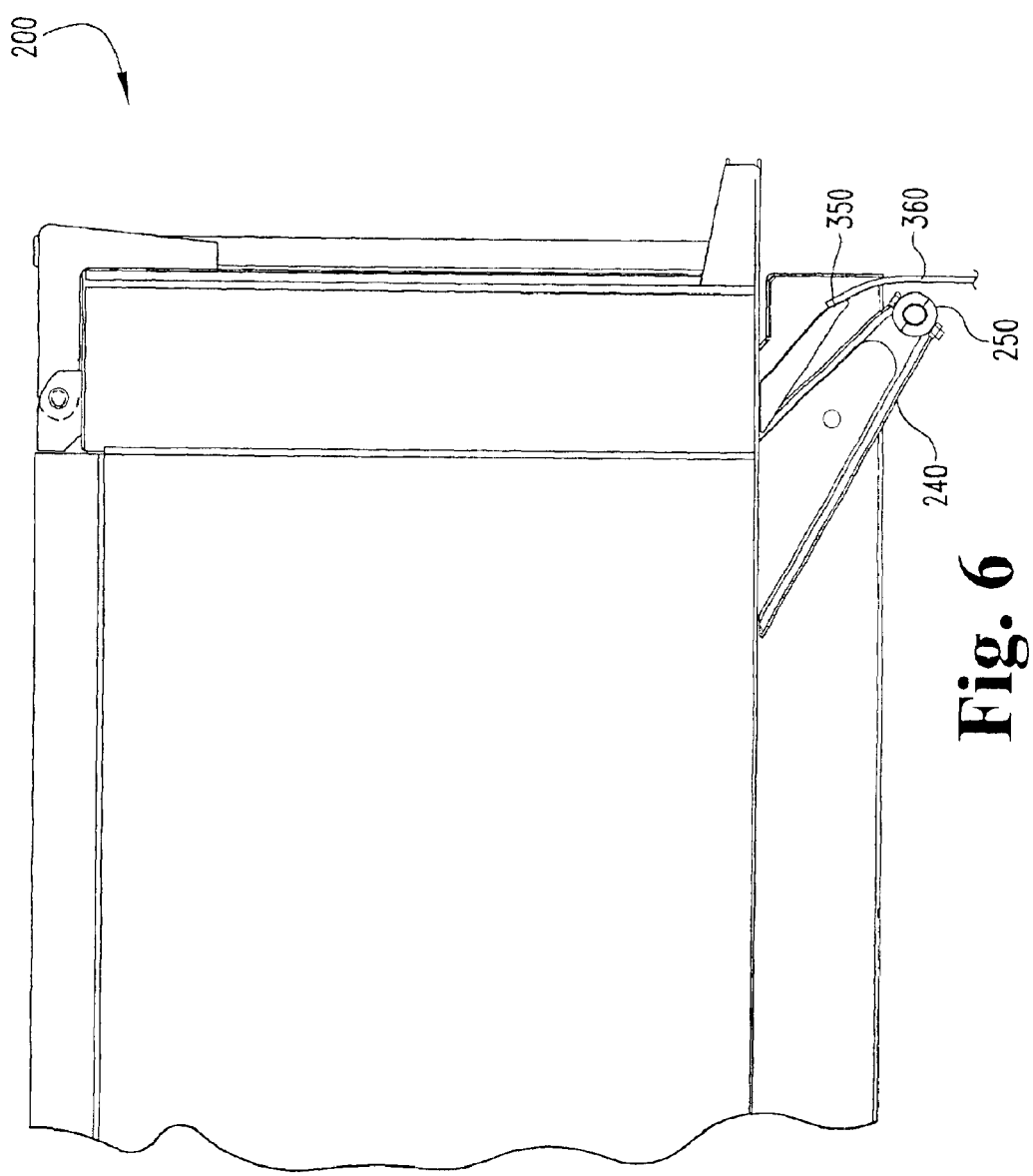
FIG. 6 is a side view of another embodiment of a dump trailer according to the present invention.

Because of the unique nature of the raising motion of a dump bed 35 according to the present invention, traditional methods for mounting mud flaps to the trailer are unsuitable. In an alternate feature, FIG. 6 shows a modified mud flap bracket 350 which allows attachment of a mud flap 360 to a trailer 200 according to the present invention. As the mud flap bracket 350 is substantially parallel to the hinge arm 240, it allows the mud flap 360 to be sufficiently displaced towards the rear of the trailer so as to not interfere with the hinge attachment 250 during the raising and lowering process.

In prior art hoppers, the clearance of the spill guard or dump section has interfered with the front panel of the hopper. To compensate for this interference, many operators removed or cut-away a section of the front panel to provide sufficient clearance. However, this reduced the carrying capacity of the hopper. According to the present invention, of the dump section and spill guard have a higher clearance extending over the front panel of the hopper, eliminating the need to remove part of the front panel. As an additional feature in one preferred embodiment, the present invention includes a thick rubber gasket or sheet material extending from the upper portion of the front hopper panel. This rubber sheet has sufficient flexibility to be impacted by the dump section and bent to allow clearance, while also having the resiliency to return to its position and retain paving material within the hopper.

While the invention has been illustrated and described in detail in the drawings and foregoing description, the same is to be considered as illustrative and not restrictive in character, it being understood that only the preferred embodiment have been shown and described and that all changes and modifications that come within the spirit of the invention are desired to be protected. The articles "a", "an", "said" and "the" are not limited to a singular element, and include one or more such element.

What is claimed is:

1. A trailer for delivering asphalt material to a paving machine comprising:
    a trailer bed for holding asphalt material, wherein said trailer bed has a dump end and a lowered position;
    a trailer frame having at least one axle;
    at least one hinge arm separating two end portions, wherein a first one of said two end portions is fixed to said trailer bed a horizontal distance offset from said axle opposite the direction of said trailer bed dump end, and a second one of said two end portions is mounted to said axle such that a closest connection between said trailer bed and said axle is non-vertical when said trailer bed is in said lowered position; and,
    wherein said hinge arm and said trailer bed define a gap open towards said dump end direction in an angle between said hinge arm and said trailer bed.

2. The trailer of claim 1 wherein said trailer includes at least two parallel hinge arms.

3. The trailer of claim 1 wherein said trailer includes at least two axles.

4. The trailer of claim 1 wherein said axle is mounted below said frame.

5. The trailer of claim 1 wherein said second end portion is pivotably mounted to said axle.

6. The trailer of claim 1 wherein said trailer is a full length dump trailer.

7. The trailer of claim 1 wherein said trailer is a semi-length dump trailer.

8. The trailer of claim 1 wherein said trailer is a full frame trailer.

9. The trailer of claim 1 wherein said trailer is a half frame trailer.

10. The trailer of claim 1 wherein said trailer further comprises a mud flap bracket substantially parallel to said hinge arm and attached to said trailer bed between said hinge arm and said trailer bed dump end.

11. A trailer for delivering asphalt material to a paving machine comprising:
    a trailer frame having a back portion;
    a trailer bed mounted to said trailer frame for holding asphalt material, wherein said trailer bed has at least one connection location and wherein said trailer bed is movable between a lowered position and a raised position;
    at least one hinge arm connected to said trailer bed at said at least one connection location and further connected to said trailer frame, wherein a closest connection between said trailer bed and said trailer frame is non-vertical, and wherein said hinge arm operates to move said at least one connection location upward and backward relative to said trailer frame when said trailer bed is moved between said lowered position and said raised position; and,
    wherein said hinge arm and said trailer bed define a gap open towards said back portion direction in an angle between said hinge arm and said trailer bed.

12. The trailer of claim 11, further comprising:
    at least one axle mounted to said trailer frame;
    wherein said at least one hinge arm is pivotably connected to said at least one axle.

13. The trailer of claim 11, wherein said at least one hinge arm further comprises:
    a frame end,
    wherein said frame end is pivotably connected to said trailer frame at a horizontal distance between the back portion of said trailer frame and said at least one trailer bed connection location.

14. The trailer of claim 13, further comprising:
    at least one axle mounted to said trailer frame;
    wherein said frame end of said at least one hinge arm is pivotably mounted to said axle.

15. The trailer of claim 14, wherein said trailer bed and said axle define a closest vertical distance, and wherein the length of said at least one hinge arm is greater than the closest vertical distance between said trailer bed and said axle.

16. The trailer of claim 11, further comprising:
    at least one mud flap unit having a bed end fixed to said trailer bed and a flap end having a mud flap;
    wherein said at least one mud flap unit is substantially parallel to said at least one hinge arm.

17. The trailer of claim 1 wherein said at least one hinge arm has a length, and said trailer bed and said axle define a closest vertical distance, and wherein the length of said at least one hinge arm is greater than said closest vertical distance between said trailer bed and said axle.

18. The trailer of claim 11, wherein said at least one hinge arm has a length, wherein said length of at least one hinge arm is greater than a vertical distance between said trailer bed and said trailer frame when said trailer bed is in said lowered position.

* * * * *